United States Patent
Ashikhmin

(10) Patent No.: US 8,107,550 B2
(45) Date of Patent: Jan. 31, 2012

(54) METHODS FOR PRECODING SIGNALS FOR TRANSMISSION IN WIRELESS MIMO SYSTEM

(75) Inventor: Alexei Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 665 days.

(21) Appl. No.: 12/232,737

(22) Filed: Sep. 23, 2008

(65) Prior Publication Data

US 2010/0074356 A1    Mar. 25, 2010

(51) Int. Cl.
*H04B 7/02* (2006.01)
(52) U.S. Cl. ........ 375/267; 375/260; 375/299; 375/340; 375/347; 455/101; 455/132; 455/296; 455/500; 455/562.1; 370/334
(58) Field of Classification Search .................. 375/260, 375/267, 299, 340, 347; 455/101, 132, 296, 455/500, 562.1; 370/334
See application file for complete search history.

(56) References Cited

U.S. PATENT DOCUMENTS

| 2008/0049709 A1* | 2/2008 | Pan et al. ....................... 370/344 |
| 2008/0159425 A1* | 7/2008 | Khojastepour et al. ....... 375/260 |
| 2010/0081399 A1* | 4/2010 | Zangi .......................... 455/114.3 |

OTHER PUBLICATIONS

Wang, H. et al., "Robust Transmission for Multiuser MIMO Downlink systems with Imperfect CSIT," IEEE Wireless Communications and Networking Conference, pp. 340-344, Mar. 31, 2008.
Huang, J. et al., "Precoder Design for Space-Time Coded MIMO Systems with Imperfect Channel State Information," IEEE Transactions on Wireless Communications, vol. 7, No. 6, pp. 1977-1981, Jun. 1, 2008.
Stojnic, M. et al., "Rate Maximization in Multi-Antenna Broadcast Channels with Linear Preprocessing," IEEE Transactions on Wireless Communications, vol. 5, No. 9, pp. 2338-2342, Sep. 1, 2006.
Duplicy, J. et al., "Robust MMSE Precoding for the MIMO Complex Gaussian Broadcast Channel," IEEE International Conference on Acoustics, Speech, and Signal Processing, pp. 421-424, Apr. 15, 2007-Apr. 20, 2007.
International Search Report dated Feb. 11, 2010.
Written Opinion dated Feb. 11, 2010.
International Preliminary Report on Patentability dated Apr. 7, 2011 for PCT/US2009/005130.
Muhammad Imadur Rahman, et al. "Combining Orthogonal Space-Frequency Block Coding and Spatial Multiplexing in MIMO-OFDM System." International OFDM Workshop. Aug. 31, 2005.

* cited by examiner

*Primary Examiner* — Leon Flores
(74) *Attorney, Agent, or Firm* — Harness, Dickey & Pierce

(57) ABSTRACT

Methods discussed herein provide more efficient precoding matrices for precoding signals prior to transmission. The methods discussed herein improve throughput in wireless MIMO systems. Methods discussed herein are applicable to frequency division duplexing (FDD) systems, time division duplexing (TDD) systems as well as other wireless communication systems.

18 Claims, 6 Drawing Sheets

A typical wireless system (CONVENTIONAL ART)

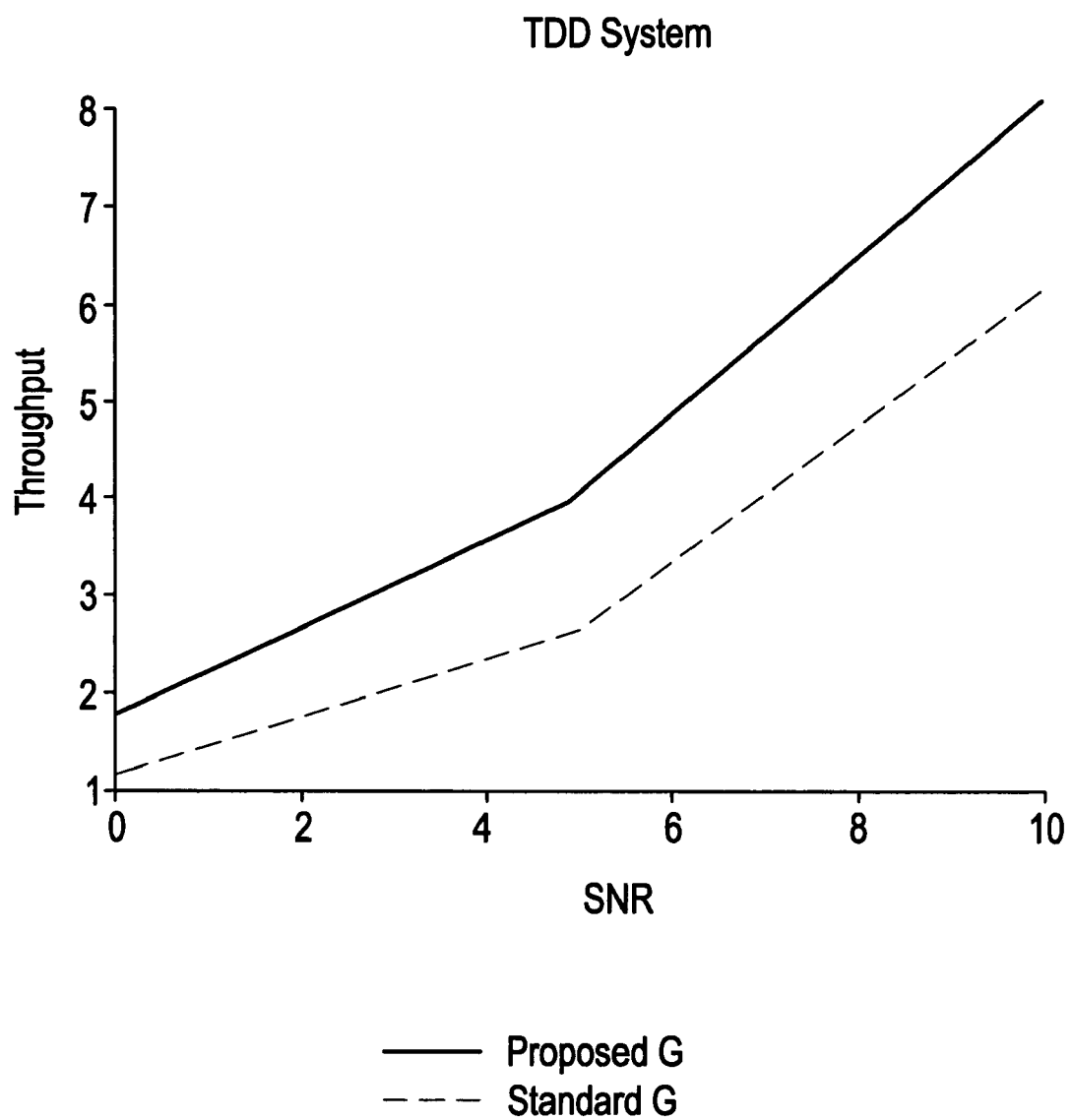

US 8,107,550 B2

METHODS FOR PRECODING SIGNALS FOR TRANSMISSION IN WIRELESS MIMO SYSTEM

BACKGROUND OF THE INVENTION

Multiple-input-multiple-output (MIMO) systems represent an advance in wireless communication. MIMO systems employ one or more (e.g., multiple) antennas at the transmitting and receiving ends of a wireless link to improve the data transmission rate, while holding radio bandwidth and power constant.

A MIMO transmitter transmits an outgoing signal using multiple antennas by demultiplexing the outgoing signal into multiple sub-signals and transmitting the sub-signals from separate antennas. MIMO exploits the multiple signal propagation paths to increase throughput and reduce bit error rates. Using MIMO techniques the rate of transmission increases linearly depending on the local environment.

A portion of a conventional multiple-input-multiple-output (MIMO) wireless broadcast system is shown in FIG. 1.

Referring to FIG. 1, a base station 100 is equipped with M antennas (in FIG. 1, M=3) and the plurality of mobiles 10-1 through 10-$t$ are equipped with one or more antennas. For the sake of clarity, it is assumed that all mobiles 10-1 through 10-$t$ are equipped with only a single antenna.

During transmission, a signal $s_j$ transmitted from the j-th antenna (where j=1, . . . , M) of the base station 100 and received by the i-th mobile 10-$i$ (where i=1, . . . , t) is multiplied by a channel coefficient vector $h_{ij}$. Signals $q_i$ for i=1, . . . , t that have to be transmitted to respective mobiles 1, 2, . . . , t are mapped into signals $s_j$ for j=1, . . . , M transmitted from respective antennas 1, . . . , M. This is known as precoding.

Precoding is generalized beamforming that supports multi-layer transmission in MIMO systems. Precoding enables multiple streams of signals to be emitted from the transmit antennas with independent and appropriate weighting per each antenna such that link throughput is maximized.

Precoding algorithms for multi-user MIMO can be subdivided into linear and nonlinear precoding types. Linear precoding approaches achieve reasonable throughput performance with lower complexity relative to nonlinear precoding approaches.

Returning to FIG. 1, conventionally, the base station 100 implements a linear precoding algorithm as follows.

The channel coefficients $h_{ij}$ form a channel matrix, $$H = \begin{bmatrix} h_1 \\ h_2 \\ \vdots \\ h_t \end{bmatrix} = \begin{bmatrix} h_{11}, h_{12}, \ldots, h_{1M} \\ h_{21}, h_{22}, \ldots, h_{2M} \\ \vdots \\ h_{t1}, h_{t2}, \ldots, h_{tM} \end{bmatrix}.$$

The entries of the channel matrix H are the channel coefficients of the channel coefficient vectors $h_i=(h_{i1}, h_{i2}, \ldots, h_{iM})$, where i=1, 2, . . . , t.

The base station 100 precodes signals $$\begin{bmatrix} q_1 \\ q_2 \\ \vdots \\ q_t \end{bmatrix}$$

to be transmitted to corresponding mobiles by computing the vector S according to equation (1) shown below in which G is an M×t complex matrix, such that Tr(GG*)=1. The operator Tr(A) is the standard trace of operators of a square matrix A. For example, if $a_{ij}$ are elements of A, and A is an M×M matrix, then $$Tr(A) = \sum_{i=1}^{M} a_{ii}.$$

$$S = \begin{bmatrix} s_1 \\ s_2 \\ \vdots \\ s_t \end{bmatrix} = G \begin{bmatrix} q_1 \\ q_2 \\ \vdots \\ q_t \end{bmatrix} \quad (1)$$

Equation (1) uses standard matrix multiplication to spread signals $q_1, q_2, \ldots, q_t$ into signals $s_1, s_2, \ldots, s_M$. Signals $q_1, q_2, \ldots, q_t$ are signals to be transmitted to mobiles 10-1, 10-2, . . . , 10-$t$, respectively. In this example, the precoding of the signals $q_1, q_2, \ldots, q_t$ spreads each of the signals among the M antennas at the base station 100.

The base station 100 then transmits the precoded signals $s_1, s_2, \ldots, s_M$ from base station antennas 1, 2, . . . , M, respectively.

At the i-th mobile 10-$i$, for example, the resultant received signal $x_i$ is equal to the linear combination of the signals sent from all M antennas of the base station 100 and the additive noise $z_i$. More specifically, the received signal $x_i$ is given by equation (2) shown below.

$$x_i = s_1 h_{i1} + s_2 h_{i2} + \ldots + s_M h_{iM} + z_i \quad (2)$$

Currently, there exists only methods for locating a precoding matrix G based on the assumption that the actual channel matrix H is equal to the estimated channel matrix $\hat{H}$, which is far from reality.

SUMMARY OF THE INVENTION

Illustrative embodiments provide methods for locating an efficient precoding matrix G using an estimated channel matrix and a set of channel matrix estimation errors.

The methods discussed herein provide significant increases in the throughput of the system compared with other known methods of linear precoding.

An illustrative embodiment provides a method for precoding signals for transmission. In this embodiment, a base station generates channel matrices as a function of an estimated channel matrix and channel estimation error matrices. The base station determines a set of first and a set of second diagonal matrices associated with the estimated channel matrix and the channel estimation error matrices. The base station iteratively computes the precoding matrix based on at least the generated channel matrices, the first set of diagonal matrices and the second set of diagonal matrices, and precodes the signals for transmission based on the precoding matrix.

Another illustrative embodiment provides a method of signal transmission from base station to mobile. According to this embodiment, the base station iteratively computes a precoding matrix based on intermediate precoding matrix parameters. The intermediate precoding matrix parameters are computed based on channel parameters associated with a wireless channel between the base station and the mobile. The channel parameters include at least generated diagonal matrices and a set of channel matrices associated with the wireless channel. The base station precodes signals for transmission to the mobile based on the precoding matrix and transmits the precoded signals to the mobile.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 6 shows simulation results for a TDD system implementing methods according to illustrative embodiments.

DETAILED DESCRIPTION OF THE EMBODIMENTS

Figure 1:
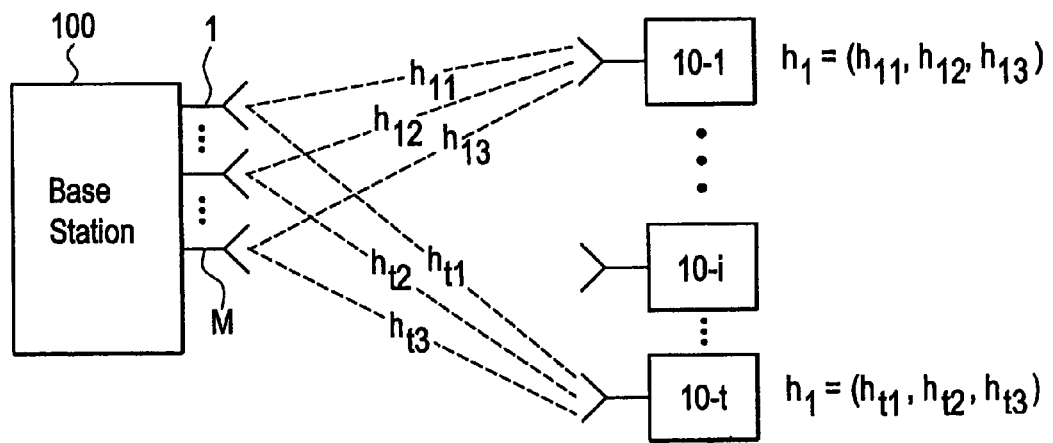
FIG. 1 illustrates a conventional MIMO system.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, the term "storage medium" or "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile" may be considered synonymous to, and may hereafter be occasionally referred to, as a client, mobile unit, mobile station, mobile user, user equipment (UE), subscriber, user, remote station, access terminal, receiver, etc., and may describe a remote user of wireless resources in a wireless communication network.

Similarly, as used herein, the term "base station" may be considered synonymous to, and may hereafter be occasionally referred to, as a Node B, base transceiver station (BTS), etc., and may describe a transceiver in communication with and providing wireless resources to mobiles in a wireless communication network. As discussed herein, base stations may have all functionally associated with conventional, well-known base stations in addition to the capability to perform the methods discussed herein.

Example embodiments will be described in the general sense with respect to the conventional MIMO system in FIG. 1, and then a somewhat more detailed description will be provided for a frequency division duplexing (FDD) system and a time division duplexing (TDD) system shown in FIGS. 3 and 5, respectively. However, it will be understood that example embodiments may be implemented in other MIMO systems as well as other wireless communication systems. For example, methods discussed herein may be implemented in connection with any communication system in which an approximated channel matrix $\hat{H}$ and a set $S_{CEE}$ of channel estimation error matrices $\tilde{H}_1, \tilde{H}_2, \ldots \tilde{H}_L$ are available at the base station or other network processing element.

Example embodiments provide methods for generating a more efficient precoding matrix for precoding signals for transmission by the base station to mobiles (the downlink). In doing so, example embodiments provide algorithms for generating an estimated (approximated) channel matrix $\hat{H}$ and a set $S_{CEE}$ of channel estimation error matrices $\tilde{H}_1, \tilde{H}_2, \ldots \tilde{H}_L$ at a base station. The index L is a parameter identifying the number of samples of matrices $\hat{H}$, or in other words, the number of matrices $\hat{H}$ used by the base station for finding an efficient precoding matrix G. The larger the value of L the more closely the generated precoding matrix G will be to the ideal precoding matrix (which would be generated if L was infinity). At the same time the larger L the higher computational complexity. Parameter L may be set by a network operator depending on many factors, such as, how powerful the computer is at the base station in which the methods discussed herein are executed.

Example embodiments provide methods for generating a more efficient precoding matrix G based on an estimated channel matrix $\hat{H}$ and a set $S_{CEE}$ of the channel estimation error matrices $\tilde{H}_1, \tilde{H}_2, \ldots \tilde{H}_L$.

Figure 2:
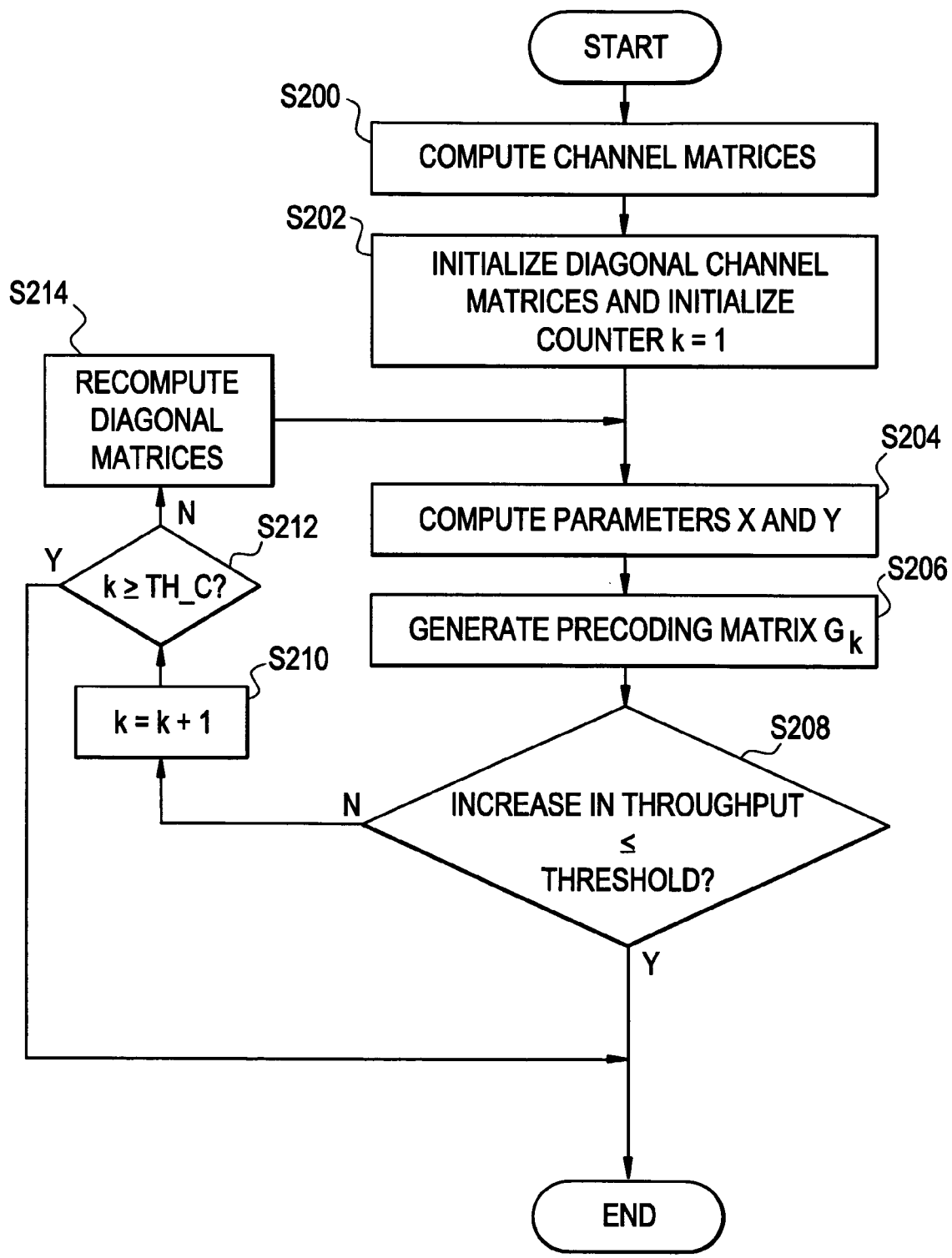
FIG. 2 is a flowchart illustrating a method for locating a precoding matrix according to an illustrative embodiment.

FIG. 2 is a flowchart illustrating an example embodiment of a method for generating a more efficient precoding matrix. The method shown by way of the flow chart in FIG. 2 may be implemented, for example, at the base station 100 in FIG. 1.

Referring to FIG. 2, at step S200 the base station 100 computes a set $S_{cm}$ of channel matrices $H_1, H_2, \ldots H_L$ based on the estimated channel matrix $\hat{H}$ and a set $S_{CEE}$ of channel estimation error matrices $\tilde{H}_1, \tilde{H}_2, \ldots \tilde{H}_L$.

The base station 100 computes a channel matrix H corresponding to each of the channel estimation errors matrices $\tilde{H}_1, \tilde{H}_2, \ldots \tilde{H}_L$ in the set $S_{CEE}$. In more detail, the base station 100 computes the set of channel matrices $S_{cm}$ according to equation (3) shown below.

$$H_l = \hat{H} + \tilde{H}_l \text{ for all } l=1, \ldots, L \quad (3)$$

As noted above, the estimated channel matrix $\hat{H}$ (not the actual channel matrix H) and statistics of the channel estimation error matrix $\tilde{H}$ (where $\tilde{H}=H-\hat{H}$) are available at the base station 100.

The base station 100 generates the set $S_{CEE}$ of channel estimation error matrices $\tilde{H}_1, \tilde{H}_2, \ldots \tilde{H}_L$ using the known statistics of the channel estimation error matrix $\tilde{H}$.

Returning to FIG. 2, at step S202 the base station 100 initializes diagonal matrices $E_j$ and $F_j$, where j=1, ..., L, for each of the computed channel matrices $H_l$. In one example, the diagonal matrices $E_j$ and $F_j$ are set equal to the identity matrix $I_M$. The matrix $I_M$ is an M×M identity matrix in which all diagonal entries are 1. For example, for M=3, the identity matrix $I_M$ is:

$$I_M = \begin{bmatrix} 1 & 0 & 0 \\ 0 & 1 & 0 \\ 0 & 0 & 1 \end{bmatrix}.$$

In more detail, the base station 100 sets the diagonal matrices for the j-th antenna $E_j$ and $F_j$ according to equation (4) shown below.

$$E_j = I_M \text{ and } F_j = I_M \text{ for all } j=1, \ldots, M \quad (4)$$

Although discussed herein as being set according to equation (4), the diagonal matrices $E_j$ and $F_j$ may be set in any suitable manner. Also at step S202, the base station 100 initializes a counter value k=1. The counter value k is used by the base station 100 to track the number of iterations of the method shown in FIG. 2.

At step S204, the base station 100 computes intermediate precoding matrix calculation parameters X and Y based on the generated diagonal matrices $E_j$ and $F_j$, the variance $\sigma^2$ of the additive noise $z_i$ (mentioned above), and the generated set $S_{cm}$ of channel matrices $H_1, H_2, \ldots H_L$. In more detail, the base station 100 computes parameters X and Y according to equations (5) and (6) shown below.

$$X = \sum_{j=1}^{L} H_j F_j H_j^* + \sigma^2 Tr(F_j) I_M \quad (5)$$

$$Y = \sum_{j=1}^{L} H_j E_j \quad (6)$$

In each of equations (5) and (6), "*" denotes the Hermitian conjugation of a complex matrix. Moreover, the intermediate precoding matrix calculation parameters X and Y are internal variables used to retain intermediate values calculated during iterations of the process shown in FIG. 2. The precoding matrix calculation parameter X is generated as a function of at least the channel matrices $H_1, H_2, \ldots H_L$, the diagonal matrices $F_j$, and the variance $\sigma^2$ of the additive noise $z_i$. The precoding matrix calculation parameter Y is generated as a function of the channel matrices $H_1, H_2, \ldots H_L$ and the diagonal matrices $E_j$.

Still referring to FIG. 2, at step S206 the base station 100 generates a precoding matrix $G_k$ (where k is the above-mentioned counter value) based on the generated intermediate precoding matrix calculation parameters X and Y. More specifically, the base station 100 generates the precoding matrix $G_k$ based on intermediate precoding matrix calculation parameter Y and the inverse of the intermediate precoding matrix calculation parameter X, or in other words $X^{-1}$. In equation form, the base station 100 computes the precoding matrix $G_k$ according to equation (7) shown below.

$$G_k = X^{-1} Y \quad (7)$$

At step S208, the base station 100 performs a first threshold operation to determine if further iterations of steps S204 and S206 are necessary. In one example, the first threshold operation is based on an increase in the throughput between the current precoding matrix and the previously (most recently) calculated preceding matrix. In this example, at least two iterations of steps S204 and S206 are performed.

At step S208, if $G_k$ is the precoding matrix found at the k-th iteration, the base station 100 computes the expected value of the throughput $T_k$ based on the generated precoding matrix $G_k$ and the corresponding channel matrix H.

In one example, the base station 100 computes the throughput $T_k$, for an arbitrary t×M channel matrix H and an arbitrary M×T precoding matrix G, as follows:

$$T(H, G) = \log\left(1 + \frac{P_1|h_1 g_1|^2}{\sum_{j \neq 1} P_j|h_1 g_j|^2 + \sigma^2}\right) +$$
$$\log\left(1 + \frac{P_2|h_2 g_2|^2}{\sum_{j \neq 2} P_j|h_2 g_j|^2 + \sigma^2}\right) + \ldots + \log\left(1 + \frac{P_M|h_M g_M|^2}{\sum_{j \neq M} P_j|h_M g_j|^2 + \sigma^2}\right).$$

In the equation shown immediately above, $g_r$ is the r-th column of the precoding matrix G, $h_j$ is the j-th row of the channel matrix H, $P_j$ is the power of the signal $q_j$, and $\sigma^2$ is the variance of the additive noise $z_i$.

More specifically with respect to the method shown in FIG. 2, the base station 100 computes the throughput $T_k$ according to equation (8).

$$T_k = \frac{1}{L}(T(H_1, G_k) + \ldots + T(H_L, G_k)) \quad (8)$$

The base station 100 then computes the difference $D_T$ between the current throughput $T_k$ and the most recently computed throughput $T_{k-1}$.

The base station 100 then compares the calculated difference $D_T$ with a throughput increase threshold value THRESHOLD. The threshold value THRESHOLD may be a predefined or given value determined by a network operator based on simulations, empirical data, etc.

Returning to step S208, if the difference $D_T$ is less than or equal to the threshold THRESHOLD, the base station 100 determines that no further iterations of steps S204 and S206 are necessary and that the precoding matrix $G_k$ is sufficient for transmission of signals by the base station 100. In other words, if the difference $D_T$ is less than or equal to the threshold THRESHOLD, the process terminates.

Returning to step S208, if the calculated difference $D_T$ is greater than the threshold THRESHOLD, the base station 100 determines that further iterations of steps S204 and S206 would be beneficial. In this case, at step S210, the base station 100 increments the counter value k=k+1 and performs a second thresholding operation at step S212 to determine whether a further iteration of steps S204 and S206 should be performed. The second thresholding operation includes comparing the counter value k with a counter threshold TH_C. The counter threshold TH_C may be set by a network operator and may have a value of, for example, 10 or more.

At step S212, if the counter value k is greater than or equal to the counter threshold TH_C, the base station 100 determines that a maximum number of iterations of steps S204 and S206 has been performed, and the process terminates. In this case, the base station 100 uses the most recently calculated precoding matrix $G_k$ in precoding signals for transmission.

Returning to step S212, if the counter value is less than the counter threshold TH_C, the method proceeds to step S214.

At step S214 new values for each of the diagonal matrices $E_j$ and $F_j$ associated with each of the M antennas are computed according to equations (9)-(10) shown below.

$$\text{diag}(E_j) = ((AB)_{11}/d_1, \ldots, (AB)_{MM}/d_M) \quad (9)$$

$$\text{diag}(F_j) = (N_1/(d_1(d_1+N_1)), \ldots, N_M/(d_M(d_M+N_M))) \quad (10)$$

Here diag(Z) is the diagonal of a square matrix Z, if for example Z is an M×M matrix and $z_{ij}$ are its entries, then $\text{diag}(Z) = (z_{11}, z_{22}, \ldots, z_{MM})$.

In equations (9) and (10), A is a t×M matrix and B is an M×t matrix set according to equations (11) and (12) set forth below.

$$A = H_j, \text{ for } j = 1, \ldots, L \quad (11)$$

$$B = G_k \quad (12)$$

Also in equations (9) and (10), $a_r$ is the r-th row of the matrix A and $b_j$ is the j-th column of matrix B. Variable $N_m$ is defined by equation (13) shown below.

$$N_m = |a_m b_m|^2 \quad (13)$$

Variable $d_m$ is defined by equation (14) shown below.

$$d_m = \sigma^2 Tr(AA^*) + \sum_{n=1, n \neq m}^{M} |a_n b_m|^2 \quad (14)$$

After recalculating values for each of the diagonal matrices $E_j$ and $F_j$, the method proceeds to step S204 and continues as discussed above.

After generating the preceding matrix $G_k$ according to the method set forth in FIG. 2 (e.g., after several iterations of the process), the base station 100 precodes signals to be transmitted using the precoding matrix $G_k$ in the manner discussed above. The base station 100 then transmits the signals to destination mobiles in any well-known manner.

In an alternative embodiment, the method of FIG. 2 may omit step S208, and use only the second thresholding operation in determining whether to continue with iterations of the process. In this case, if the counter value k is less than the counter threshold TH_C, the method proceeds to step S214 (discussed in detail above). Otherwise, the process terminates.

In an alternative embodiment, methods according to illustrative embodiments may be characterized as equivalent to finding a maximum in the equation $E_{\tilde{H}}[T(\hat{H}+\tilde{H},G)]$. In this equation, $E_{\tilde{H}}$ is the operator of expectation with respect to the probability distribution of $\tilde{H}$.

Two more specific example embodiments will described in more detail below.

FDD System Example

Figure 3:
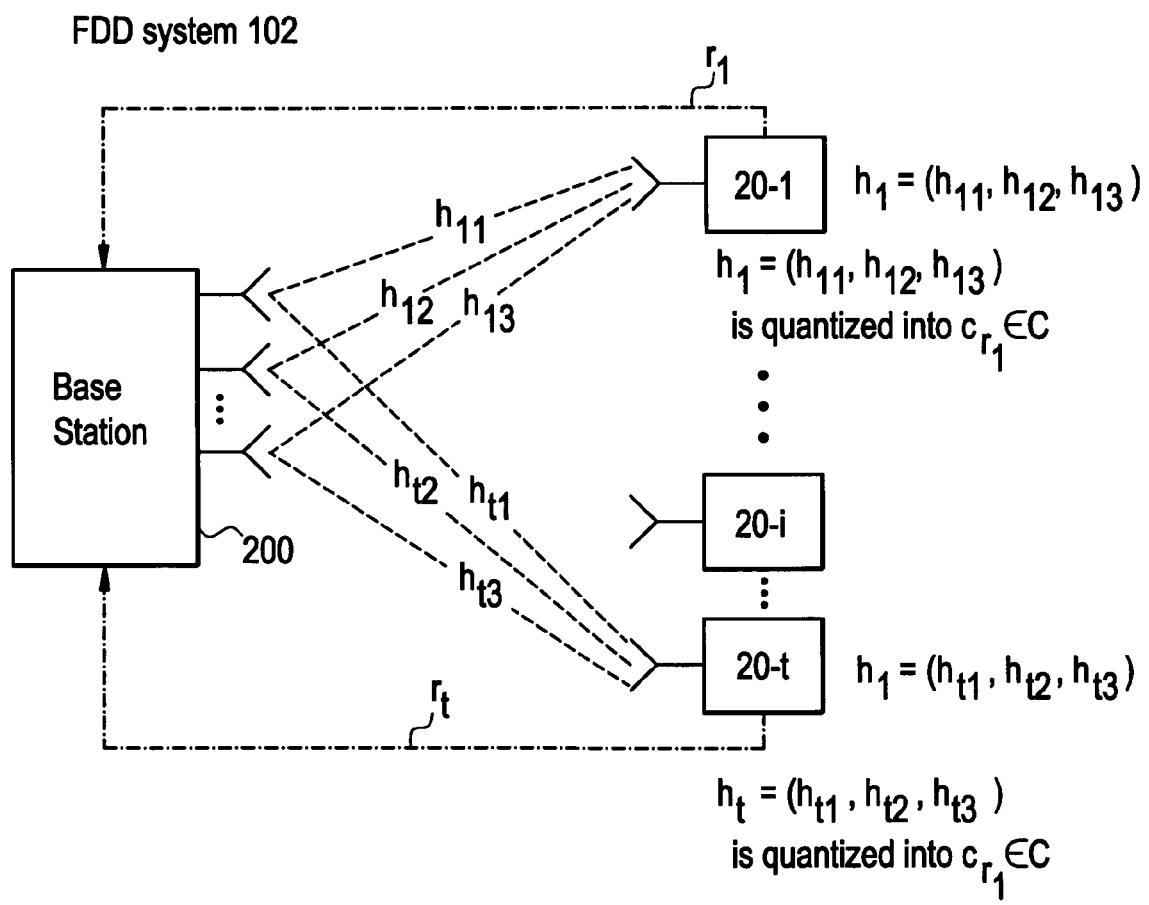
FIG. 3 illustrates a portion of a frequency division duplexing (FDD) system in which example embodiments may be implemented.

FIG. 3 illustrates a frequency division duplexing (FDD) system 102 in which example embodiments may be implemented.

In FDD systems such as that shown in FIG. 3, the base station 200 sends pilot signals to mobiles 20-1 through 20-t. The base station 200 may be the same or substantially the same as the base station 100 shown in FIG. 1. Using these pilot signals each mobile 20-1 through 20-t estimates its channel vector based on the received pilot signals in any well known manner. For example, the channel vector $h_i$ for the i-th mobile is given by equation (15) shown below.

$$h_i = (h_{i1}, h_{i2}, \ldots, h_{iM}), i = 1, \ldots, M \quad (15)$$

The mobiles 20-1 through 20-t transmit approximations of their channel vectors back to the base station 200 via a separate frequency band.

Conventionally, unnecessary mobile resources (e.g., time and bandwidth) are used to transmit these channel vectors directly to the base station 200 because each channel vector consists of M complex numbers (e.g., $h_{i1}, \ldots, h_{iM}$ for the i-th mobile). A conventional approach to reduce the use of resources is to use a quantization codebook.

A quantization codebook $C=\{c_1=(c_{11}, \ldots, c_{1M}), \ldots, c_B=(c_{B1}, \ldots, c_{BM})\}$ known to all of the mobiles 20-1 through 20-t and to the base station 200 is designated in advance, for example, by a network operator.

Using the quantization codebook, after receiving the pilot signals and computing the channel vector $h_i=(h_{i1}, h_{i2}, \ldots, h_{iM})$, the i-th mobile identifies the code vector $c_{r_i}=(c_{r_i1}, \ldots, c_{r_iM}) \in C$ that is closest to the computed channel vector $h_i=(h_{i1}, h_{i2}, \ldots, h_{iM})$. In one example, the i-th mobile determines the code vector $c_{r_i}=(c_{r_i1}, \ldots, c_{r_iM}) \in C$ that is closest to the computed channel vector $h_i=(h_{i1}, h_{i2}, \ldots, h_{iM})$ according to equation (16) shown below.

$$\text{dist}(c_{r_i}, h_i) < \text{dist}(c_j, h_i) \text{ for any } j \neq r_i \quad (16)$$

In equation (16), dist(x,y) is a function that measures distance between vectors x and y. As is well-known in the art, there are many possibilities for dist(x,y) and any suitable one may be used. In one example, dist(x,y) may be the Euclidean distance between x and y. For example, if vector $x=(x_1, x_2, \ldots, x_M)$ and vector $y=(y_1, y_2, \ldots, y_M)$, then $$\text{dist}(x, y) = \sum_{j=1}^{M} |x_j - y_j|^2.$$

After identifying the closest $c_{r_i}$, the i-th mobile 20-i transmits only the index $r_i$ to the base station 200, rather than the entire channel vector $h_i=(h_{i1}, h_{i2}, \ldots, h_{iM})$. The base station 200 identifies the vector $c_{r_i}=(c_{r_i1}, \ldots, c_{r_iM}) \in C$ based on the received index $r_i$ and treats the vector $c_{r_i}=(c_{r_i1}, \ldots, c_{r_iM}) \in C$ as an approximation of the channel vector $h_i=(h_{i1}, h_{i2}, \ldots, h_{iM})$. Using the indices $r_1, \ldots, r_t$ received from the mobiles 10-1, ..., 10-t, respectively, the base station 200 generates an estimate of the channel matrix $\hat{H}$ according to equation (17) shown below.

$$\hat{H} = \begin{bmatrix} c_{r_1} \\ c_{r_2} \\ \vdots \\ c_{r_t} \end{bmatrix} \quad (17)$$

In more detail, upon receiving indices $r_1, r_2, \ldots, r_t$ from the mobiles 20-1 through 20-t, the base station 200 forms channel estimation error matrices $\tilde{H}_j$, for $j=1, \ldots, L$ based on the set of code vectors $c_{r_i}$ corresponding to the received indices $r_1, r_2, \ldots, r_t$. For example, the base station 200 forms the channel estimation error matrices $\tilde{H}_j$, for $j=1, \ldots, L$ such that the i-th row of channel estimation error matrix $\tilde{H}_j$ is a random vector from the set $C_{r_i}$ (where random vectors from $C_{r_i}$ are taken according to a uniform distribution). For the r-th code word $C_r=(c_{r_1}, \ldots, c_{r_M}) \in C$ the set $C_r$ is defined by $C_r=\{h_i:\text{dist}(h_i, c_r) < \text{dist}(h_i, c_j) \text{ for any } j \neq r\}$. The channel estimation error matrices $\tilde{H}_j$, for $j=1, \ldots, L$ are random samples of estimation error generated according to the distribution of channel estimation error $\tilde{H}$.

Using the computed estimated channel matrix $\hat{H}$ and the channel estimation error matrices $\tilde{H}_j$, for $j=1, \ldots, L$ the base station 200 generates the precoding matrix $G_k$ as discussed above with regard to FIG. 2.

Figure 4:
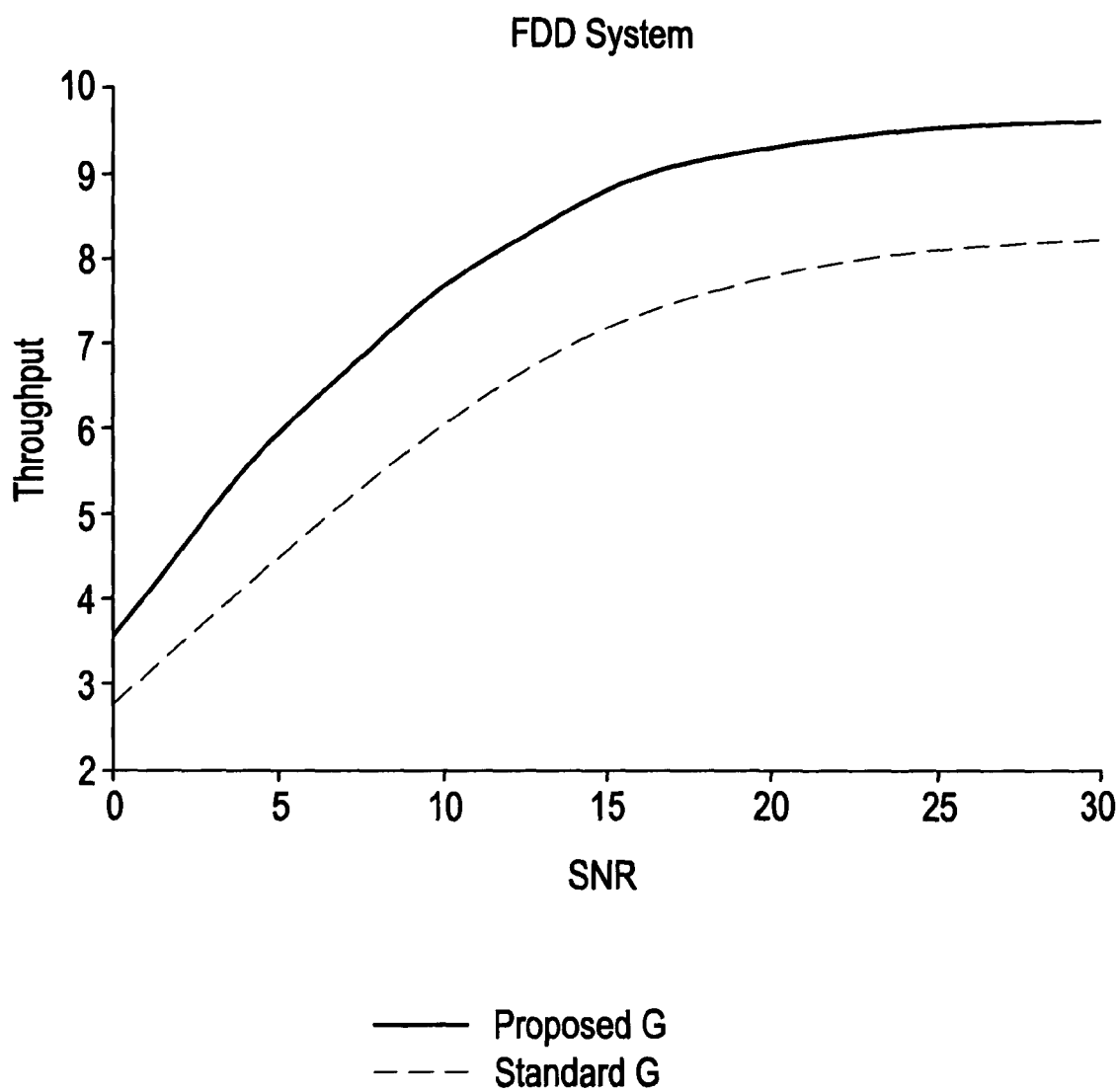
FIG. 4 shows simulation results for an FDD system implementing methods according to illustrative embodiments.

FIG. 4 shows simulation results for the case in which the base station has M=8 antennas, the number of mobiles t is 4, and a suitable quantization code book C. The throughputs of systems with precoding matrix G were generated according to example embodiments described herein and with precoding matrix G generated according to the known zero-forcing method. As shown in FIG. 4, the methods described herein provide a significant increase in the system throughput.

TDD System Example

Figure 5:
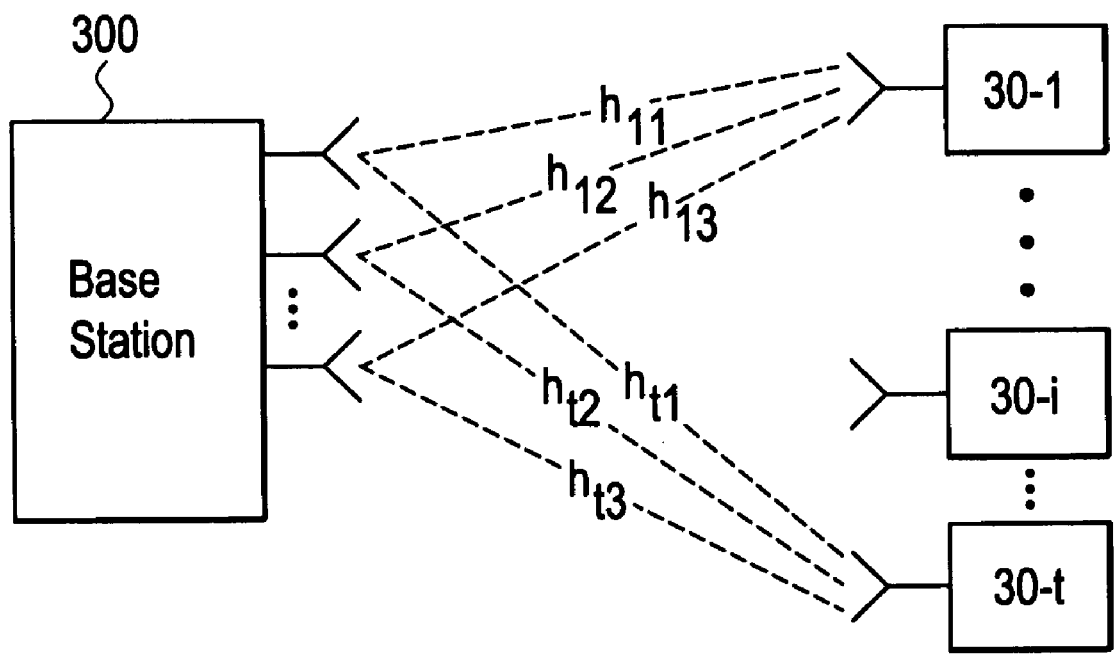
FIG. 5 illustrates a portion of a time-division duplexing (TDD) system in which example embodiments may be implemented.

FIG. 5 illustrates a portion of a time division duplexing (TDD) wireless system for further explaining methods according to example embodiments.

In the TDD system 302, mobiles 30-1 through 30-t send pilot signals to the base station 300 and the base station 300 computes channel estimates $\hat{h}_{ij}$ of the channel coefficients $h_{ij}$ between the i-th mobile and the j-th antenna. The base station 300 may be the same or substantially the same as the base station 100 in FIG. 1 and/or the base station 200 in FIG. 3.

Based on these computed channel estimates $\hat{h}_{ij}$ the base station 300 generates the estimated channel matrix $\hat{H}$. Methods for doing so are well-known in the art. Therefore a description of this methodology is omitted for the sake of brevity.

Since mobiles 30-1 through 30-t typically transmit with a low power, their pilot signals are also weak and therefore estimation error is usually large. A conventional, known way to obtain channel estimates $\hat{h}_{ij}$ is to use a linear minimum mean square error estimator.

In this example, estimation errors are independent of the estimated channel matrix $\hat{H}$. Moreover, the probability distribution function (PDF) of the estimation errors may be found analytically in the case of Gaussian channel or with the help of simulations. Methods for determining the PDF of the estimation error are well-known in the art. Thus, for the sake of this discussion, it is assumed that the PDF of the estimation errors is known at the base station 100. In this example, it is assumed that f is the PDF of the estimation errors.

Based on the PDF f, the base station 300 generates a set of random matrices $\tilde{H}_i$, for $i=1, \ldots, L$. It is noted that the matrices $\tilde{H}_i$, for $i=1, \ldots, L$ may be computed in advance. Also note that in many cases the entries are independent and identically distributed, as in the case of Gaussian channels. Methods for generating random matrices based on a known PDF of estimation errors are well-known in the art.

Using the estimated channel matrix $\hat{H}$ and random matrices $\tilde{H}_i$, for $i=1, \ldots, L$, the base station 300 generates the precoding matrix $G_k$ according the method discussed above with regard to FIG. 2.

FIG. 6 shows simulation results for a case in which the base station has M=6 antennas and the system includes t=4 mobiles. The graph was generated using throughputs of systems with preceding matrix $G_k$ generated according to the method shown in FIG. 2 and with precoding matrix $G_k$ generated according to the well-known regularized zero forcing method. Example embodiments clearly provide a significant increase in the system throughput.

Methods discussed herein provide significant increases in the throughput of the system compared with other known methods of linear precoding.

The invention being thus described, it will be obvious that the same may be varied in many ways. Such variations are not to be regarded as a departure from the invention, and all such modifications are intended to be included within the scope of the invention.

I claim:

1. A method for precoding signals for transmission, the method comprising:
   generating, at a base station, channel matrices as a function of an estimated channel matrix and channel estimation error matrices;
   determining, at the base station, a set of first and a set of second diagonal matrices associated with the estimated channel matrix and the channel estimation error matrices;
   iteratively computing, at the base station, a precoding matrix and an expected throughput, based on at least the generated channel matrices, the first set of diagonal matrices and the second set of diagonal matrices;
   determining whether to cease the iteratively computing step based on the iteratively computed throughput and a threshold value by comparing a difference between a first expected throughput and a second expected throughput with the threshold value, wherein if the difference between the first and second expected throughputs is greater than the threshold value, the base station performs a third iteration of the iteratively computing step; and
   precoding the signals for transmission based on the precoding matrix.

2. The method of claim 1, wherein the iteratively computing step comprises:
   re-determining the first and second sets of diagonal matrices during each iteration of computing the precoding matrix.

3. The method of claim 2, wherein,
   the iteratively computing step includes,
      first calculating, during a first iteration of the iteratively computing step, a first precoding matrix based on at least the generated channel matrices, the first set of diagonal matrices and the second set of diagonal matrices,
      computing the first expected throughput based on the calculated first precoding matrix,
      calculating, during a second iteration of the iteratively computing step, a second precoding matrix based on at least the generated channel matrices, the re-determined first set of diagonal matrices and the re-determined second set of diagonal matrices, and
      computing the second expected throughput based on the calculated second precoding matrix.

4. The method of claim 3, wherein the determining whether to cease the iteratively computing step further comprises:
   wherein
      if the difference between the first and second expected throughputs is less than the threshold value, the base station cease the iteratively computing step and does not perform a third iteration of the iteratively computing step.

5. The method of claim 4, wherein the precoding step further comprises:
   precoding the signals for transmission by the base station based on the second precoding matrix.

6. The method of claim 5, further comprising:
   transmitting the precoded signals to a destination mobile.

7. The method of claim 1, further comprising:
   transmitting the precoded signals to a destination mobile.

8. A method of signal transmission from base station to mobile, the method comprising:
   iteratively computing, at the base station, a precoding matrix and an expected throughput, based on intermediate precoding matrix parameters, the intermediate precoding matrix parameters being computed based on channel parameters associated with a wireless channel between the base station and the mobile, the channel parameters including at least generated diagonal matrices and a set of channel matrices associated with the wireless channel;
   determining, at the base station, whether to cease the iteratively computing step based on the iteratively computed throughput and a threshold value by comparing a difference between a first expected throughput and a second expected throughput with the threshold value, wherein if the difference between the first and second expected throughputs is greater than the threshold value, the base station performs a third iteration of the iteratively computing step;
   precoding signals for transmission to the mobile based on the precoding matrix; and
   transmitting the precoded signals to the mobile.

9. The method of claim 8, wherein the iteratively computing step includes,
   first calculating, during a first iteration of the iteratively computing step, a first precoding matrix based on a first set of intermediate precoding matrix parameters;
   computing the first expected throughput based on the calculated first precoding matrix;
   calculating, during a second iteration of the iteratively computing step, a second precoding matrix based on a second set of intermediate precoding matrix parameters;
   computing the second expected throughput based on the calculated second precoding matrix.

10. The method of claim 9, wherein the determining whether to cease the iteratively computing step further comprises:
   wherein
      if the difference between the first and second expected throughputs is less than the threshold value, the base station does not perform a third iteration of the iteratively computing step.

11. A method for precoding signals for transmission, the method comprising:
   generating, at a base station, channel matrices as a function of an estimated channel matrix and channel estimation error matrices;
   determining, at the base station, a set of first and a set of second diagonal matrices associated with the estimated channel matrix and the channel estimation error matrices;
   iteratively computing, at the base station, a precoding matrix and an expected throughput, based on at least the generated channel matrices, the first set of diagonal matrices and the second set of diagonal matrices;
   comparing, at the base station, a difference between a first expected throughput and a second expected throughput with the threshold value;
   incrementing a counter value, at the base station, if the difference between the first and second expected throughputs is greater than the threshold value;
   comparing, at the base station, the incremented counter value with a counter threshold value;

determining, at the base station, whether to cease the iteratively computing step based on the comparison between the incremented counter value and the counter threshold value; and precoding, at the base station, the signals for transmission based on the precoding matrix.

12. The method of claim 11, wherein the base station performs a third iteration of the iteratively computing step if the counter value is less than the counter threshold value.

13. The method of claim 11, wherein the base station does not perform a third iteration of the iteratively computing step if the incremented counter value is greater than or equal to the counter threshold value.

14. The method of claim 13, wherein the precoding step further comprises:

precoding the signals for transmission by the base station based on the second precoding matrix.

15. A method of signal transmission from base station to mobile, the method comprising:

iteratively computing, at the base station, a precoding matrix and an expected throughput, based on intermediate precoding matrix parameters, the intermediate precoding matrix parameters being computed based on channel parameters associated with a wireless channel between the base station and the mobile, the channel parameters including at least generated diagonal matrices and a set of channel matrices associated with the wireless channel;

comparing, at the base station, a difference between a first expected throughput and a second expected throughput with the threshold value;

incrementing a counter value, at the base station, if the difference between the first and second expected throughputs is greater than the threshold value;

comparing, at the base station, the incremented counter value with a counter threshold value;

determining, at the base station, whether to cease the iteratively computing step based on the comparison between the incremented counter value and the counter threshold value;

precoding signals, at the base station, for transmission to the mobile based on the precoding matrix; and transmitting, at the base station, the precoded signals to the mobile.

16. The method of claim 15, wherein the base station performs a third iteration of the iteratively computing step if the counter value is less than the counter threshold value.

17. The method of claim 15, wherein the base station does not perform a third iteration of the iteratively computing step if the incremented counter value is greater than or equal to the counter threshold value.

18. The method of claim 17, wherein the precoding step further comprises:

precoding the signals for transmission by the base station based on the second precoding matrix.

* * * * *